(12) United States Patent
Li et al.

(10) Patent No.: US 10,112,240 B2
(45) Date of Patent: Oct. 30, 2018

(54) MILLING CUTTER

(71) Applicant: JI ZHUN PRECISION INDUSTRY (HUI ZHOU) CO., LTD., Huizhou (CN)

(72) Inventors: Jun-Qi Li, Shenzhen (CN); Yi-Min Jiang, Shenzhen (CN); Long Xu, Shenzhen (CN); Li-Feng Zhan, Shenzhen (CN)

(73) Assignee: JI ZHUN PRECISION INDUSTRY (HUI ZHOU) CO., LT, Huizhou (CN)

( * ) Notice: Subject to any disclaimer, the term of this patent is extended or adjusted under 35 U.S.C. 154(b) by 479 days.

(21) Appl. No.: 14/805,751

(22) Filed: Jul. 22, 2015

(65) Prior Publication Data

US 2016/0107247 A1   Apr. 21, 2016

(30) Foreign Application Priority Data

Oct. 17, 2014   (CN) .......................... 2014 1 0551935

(51) Int. Cl.
| | |
|---|---|
| *B23C 5/20* | (2006.01) |
| *B23C 3/12* | (2006.01) |
| *B23C 5/10* | (2006.01) |
| *B23C 5/14* | (2006.01) |

(52) U.S. Cl.
CPC .............. *B23C 3/12* (2013.01); *B23C 5/1081* (2013.01); *B23C 5/14* (2013.01); *B23C 2210/242* (2013.01); *B23C 2210/285* (2013.01); *B23C 2210/287* (2013.01)

(58) Field of Classification Search
CPC ... B23C 3/12; B23C 5/1081; B23C 2210/242; B23C 2210/285; B23C 2210/287; B23C 5/14
See application file for complete search history.

(56) References Cited

U.S. PATENT DOCUMENTS

| | | | | | |
|---|---|---|---|---|---|
| 1,898,732 | A | * | 2/1933 | Krohne ..................... | B23C 5/14 407/31 |
| 2,188,631 | A | * | 1/1940 | Kraus ................... | B23B 51/042 175/403 |
| 2,262,353 | A | * | 11/1941 | Butters ..................... | B23C 5/14 407/62 |

(Continued)

FOREIGN PATENT DOCUMENTS

| | | |
|---|---|---|
| CN | 101495261 A | 7/2009 |
| CN | 201350520 Y | 11/2009 |

(Continued)

*Primary Examiner* — Sara Addisu
(74) *Attorney, Agent, or Firm* — ScienBiziP, P.C.

(57) ABSTRACT

A milling cutter is configured to process an edge of a workpiece to a required profile. The required profile includes a first portion and a second portion coupled to the first portion. The milling cutter includes a shank having a central axis, at least one first cutting edge, and at least one second cutting edge. The first cutting edge is configured to rotate around the central axis of the shank along a first rotation path to process the first portion of the predetermined profile, and the second cutting edge is configured to rotate around the central axis of the shank along a second rotation path to process the second portion of the predetermined profile. The first rotation path is different from, and connected to the second rotation path.

10 Claims, 7 Drawing Sheets

(56) References Cited

U.S. PATENT DOCUMENTS

| | | | | |
|---|---|---|---|---|
| 2,582,524 | A * | 1/1952 | Blazek | B23D 77/042 408/154 |
| 2,901,222 | A * | 8/1959 | Pease, Jr. | E21B 10/54 175/392 |
| 3,548,687 | A * | 12/1970 | Holloway | B23B 51/0406 408/206 |
| 3,678,554 | A * | 7/1972 | Ezhov | B23C 5/14 407/115 |
| 3,859,700 | A * | 1/1975 | Jilbert | B23C 3/28 407/103 |
| 4,252,480 | A * | 2/1981 | Mizuno | B23B 51/048 407/113 |
| 4,265,574 | A * | 5/1981 | Eckle | B23B 51/048 407/48 |
| 4,335,983 | A * | 6/1982 | Wermeister | B23C 5/2265 407/41 |
| 4,586,858 | A * | 5/1986 | Kubota | B23B 51/04 408/211 |
| 4,669,923 | A * | 6/1987 | McKinney | B23C 3/126 144/145.3 |
| 4,927,303 | A * | 5/1990 | Tsujimura | B23C 5/1027 407/42 |
| 5,094,573 | A * | 3/1992 | Hougen | B23B 51/0406 407/53 |
| 5,314,272 | A * | 5/1994 | Kubota | B23B 51/048 408/188 |
| 5,908,269 | A * | 6/1999 | Cox | B23C 3/28 407/59 |
| 5,931,616 | A * | 8/1999 | Daub | B23C 3/28 407/34 |
| 5,957,633 | A * | 9/1999 | Hall | B23B 51/009 407/113 |
| 5,988,956 | A * | 11/1999 | Omi | B23B 51/0406 408/204 |
| 6,053,673 | A * | 4/2000 | Swift | B23B 51/10 407/42 |
| 6,164,877 | A * | 12/2000 | Kamata | B23C 5/02 407/61 |
| 6,257,810 | B1 * | 7/2001 | Schmitt | B23G 5/18 409/66 |
| 6,322,296 | B1 * | 11/2001 | Wetli | B23C 3/30 407/42 |
| 6,883,234 | B2 * | 4/2005 | Packman | B23C 3/30 29/558 |
| 6,939,090 | B1 * | 9/2005 | Nagaya | B23C 5/109 407/113 |
| 7,007,382 | B2 * | 3/2006 | Mantel | B24B 19/02 29/557 |
| 8,327,742 | B1 * | 12/2012 | Austin | B23C 5/2472 407/37 |
| 2008/0193232 | A1 * | 8/2008 | van Iperen | B23C 5/10 407/54 |
| 2009/0245947 | A1 * | 10/2009 | Turcot | B23C 5/08 407/33 |
| 2010/0104386 | A1 * | 4/2010 | Nagase | B23C 3/34 409/132 |
| 2011/0091297 | A1 * | 4/2011 | Itoh | B23C 3/30 408/223 |
| 2011/0182685 | A1 * | 7/2011 | Barnat | B23C 3/30 409/131 |
| 2012/0170985 | A1 * | 7/2012 | Hill | B23C 5/10 407/62 |
| 2013/0251472 | A1 * | 9/2013 | Mori | B23C 3/12 409/132 |
| 2014/0126968 | A1 * | 5/2014 | Van Den Boogard | B23C 5/10 407/54 |
| 2014/0341661 | A1 * | 11/2014 | Lin | B23C 5/12 407/53 |
| 2015/0299051 | A1 * | 10/2015 | Kinoshita | B27G 13/12 144/229 |
| 2016/0193670 | A1 * | 7/2016 | Kopton | B23C 5/06 409/131 |
| 2017/0216938 | A1 * | 8/2017 | Tsuduki | B23C 5/14 |

FOREIGN PATENT DOCUMENTS

| | | | |
|---|---|---|---|
| CN | 203471019 U | 3/2014 | |
| DE | 20007664 U1 * | 7/2000 | B23G 5/184 |
| DE | 102014008033 A1 * | 12/2015 | B23C 3/12 |
| JP | 06170629 A * | 6/1994 | B23B 51/10 |
| JP | 2007276010 A * | 10/2007 | |
| JP | 2009061549 A * | 3/2009 | B23C 3/34 |

* cited by examiner

MILLING CUTTER

FIELD

The subject matter herein generally relates to a milling cutter.

BACKGROUND

In processing a workpiece, a milling cutter is used to process an edge of the workpiece to a required profile. A conventional milling cutter includes a copying blade adapted to the required profile configured to process the workpiece. The copying blade is one-piece and includes a cutting edge, and a profile of the cutting edge has same shape and size as the required profile.

BRIEF DESCRIPTION OF THE DRAWINGS

Implementations of the present technology will now be described, by way of example only, with reference to the attached figures.

DETAILED DESCRIPTION

Figure 1:
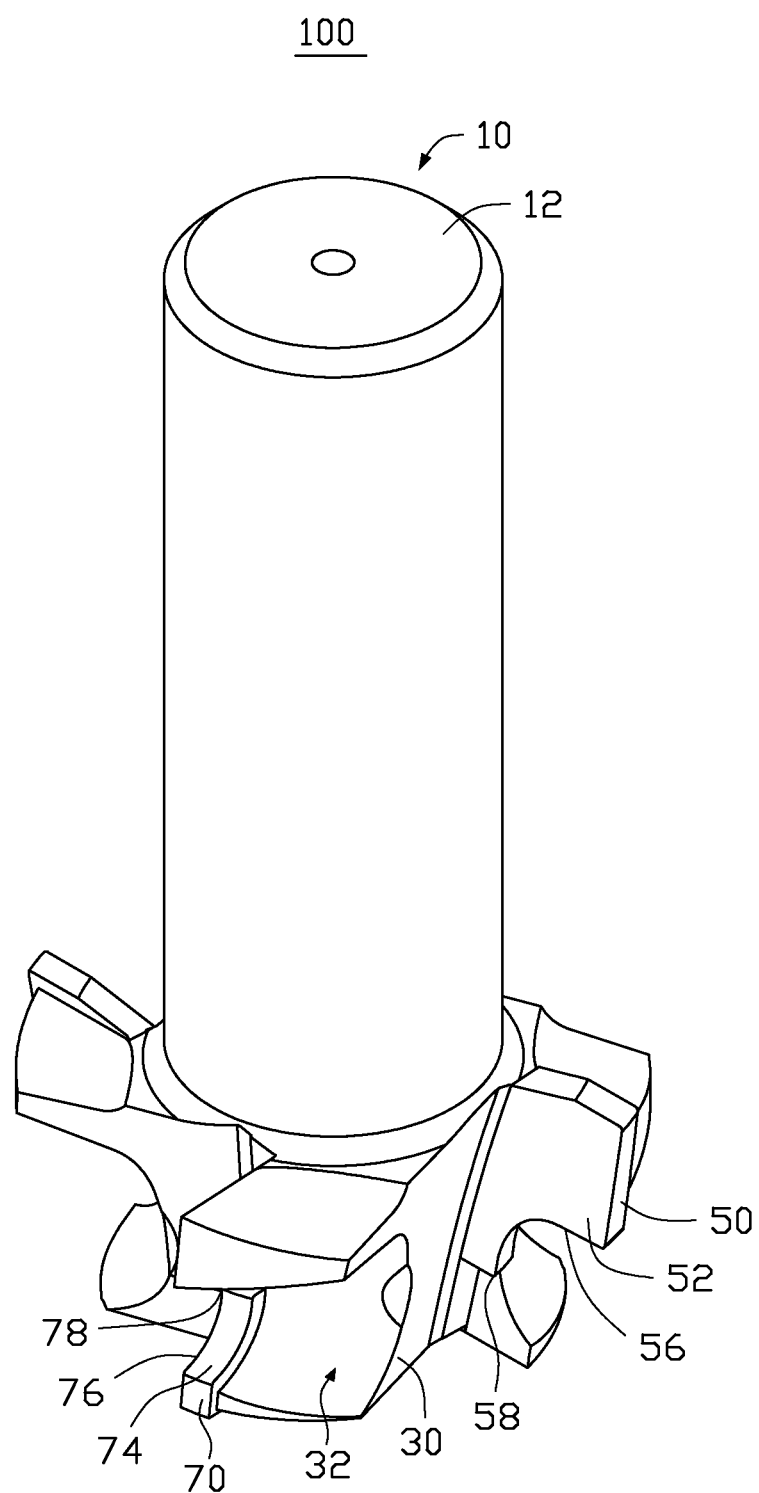
FIG. 1 is an isometric view of a first embodiment of a milling cutter.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Several definitions that apply throughout this disclosure will now be presented.

The term "coupled" is defined as coupled, whether directly or indirectly through intervening components, and is not necessarily limited to physical connections. The connection can be such that the objects are permanently coupled or releasably coupled. The term "substantially" is defined to be essentially conforming to the particular dimension, shape or other word that substantially modifies, such that the component need not be exact. For example, substantially cylindrical means that the object resembles a cylinder, but can have one or more deviations from a true cylinder. The term "comprising" when utilized, means "including, but not necessarily limited to"; it specifically indicates open-ended inclusion or membership in the so-described combination, group, series and the like.

The present disclosure is described in relation to a milling cutter configured to process an edge of a workpiece, enabling the workpiece to get a required profile.

FIG. 1 illustrates that a milling cutter 100 of a first embodiment includes a shank 10, a plurality of blade supports 30 coupled to the shank 10, at least one first blade 50, and at least one second blade 70. The at least one first blade 50 and the at least one second blade 70 can be mounted on the blade supports 30. The shank 10 can be column shaped and includes a main body 12.

Figure 2:
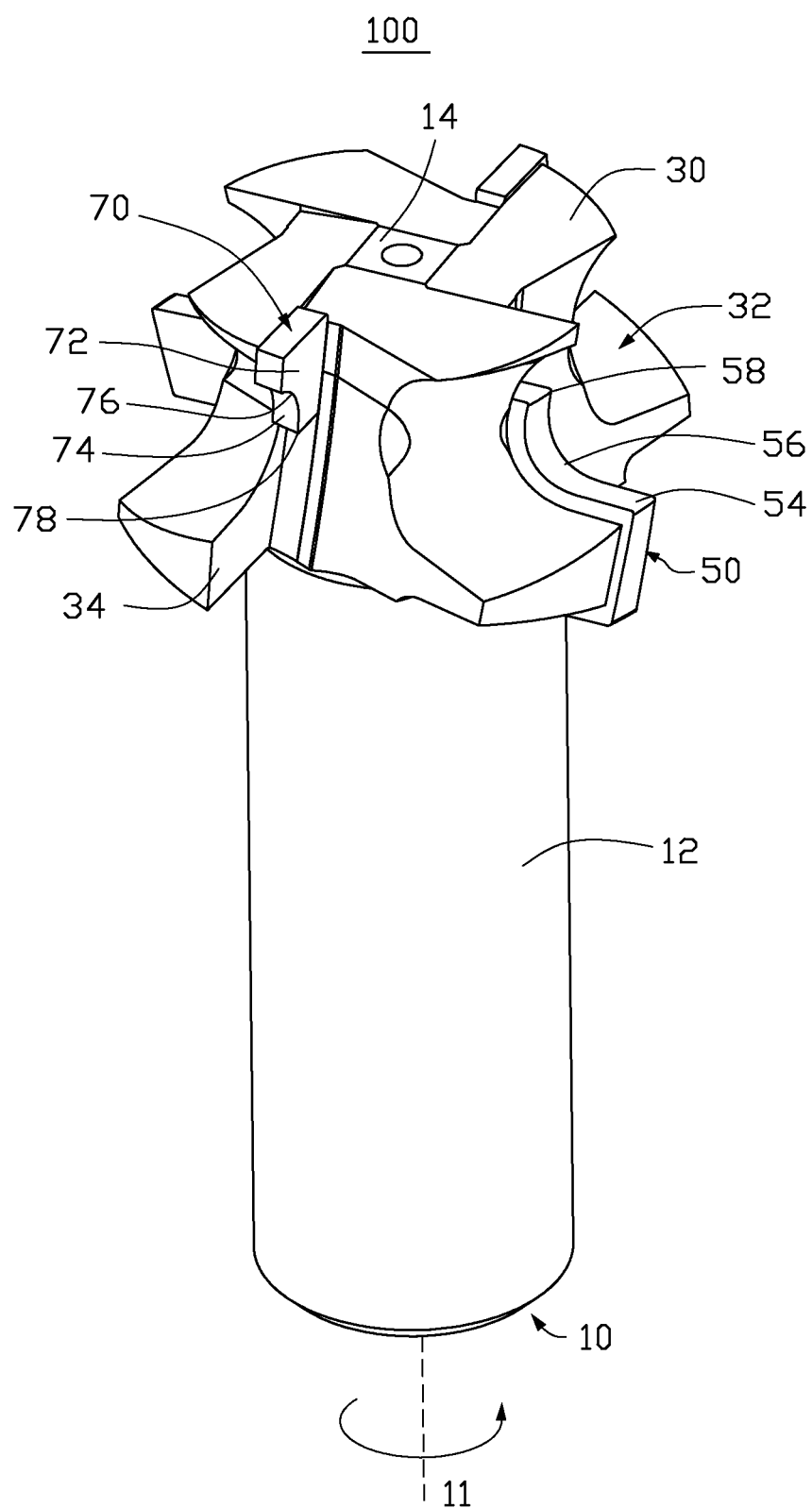
FIG. 2 is an isometric view of the milling cutter shown in FIG. 1 viewed from another angle.

FIG. 2 illustrates that the shank 10 can further include an assembly end 14 formed at one end of the main body 12, and the blade supports 30 can number four. The four blade supports 30 can be positioned around and fixed to the assembly end 14.

Each blade support 30 can be substantially irregular block shaped and extend away from the assembly end 14 along a radial of the main body 12. One surface of the blade support 30 away from the assembly end 14 can define a chip groove 32, thus chips generated in using can be removed from the chip groove 32. Each blade support 30 can include a mounting surface 34. The mounting surface 34 can be inclined to a central axis 11 of the shank 10 and arranged at front end of the blade support 30 when the blade support 30 rotates.

Figure 3:
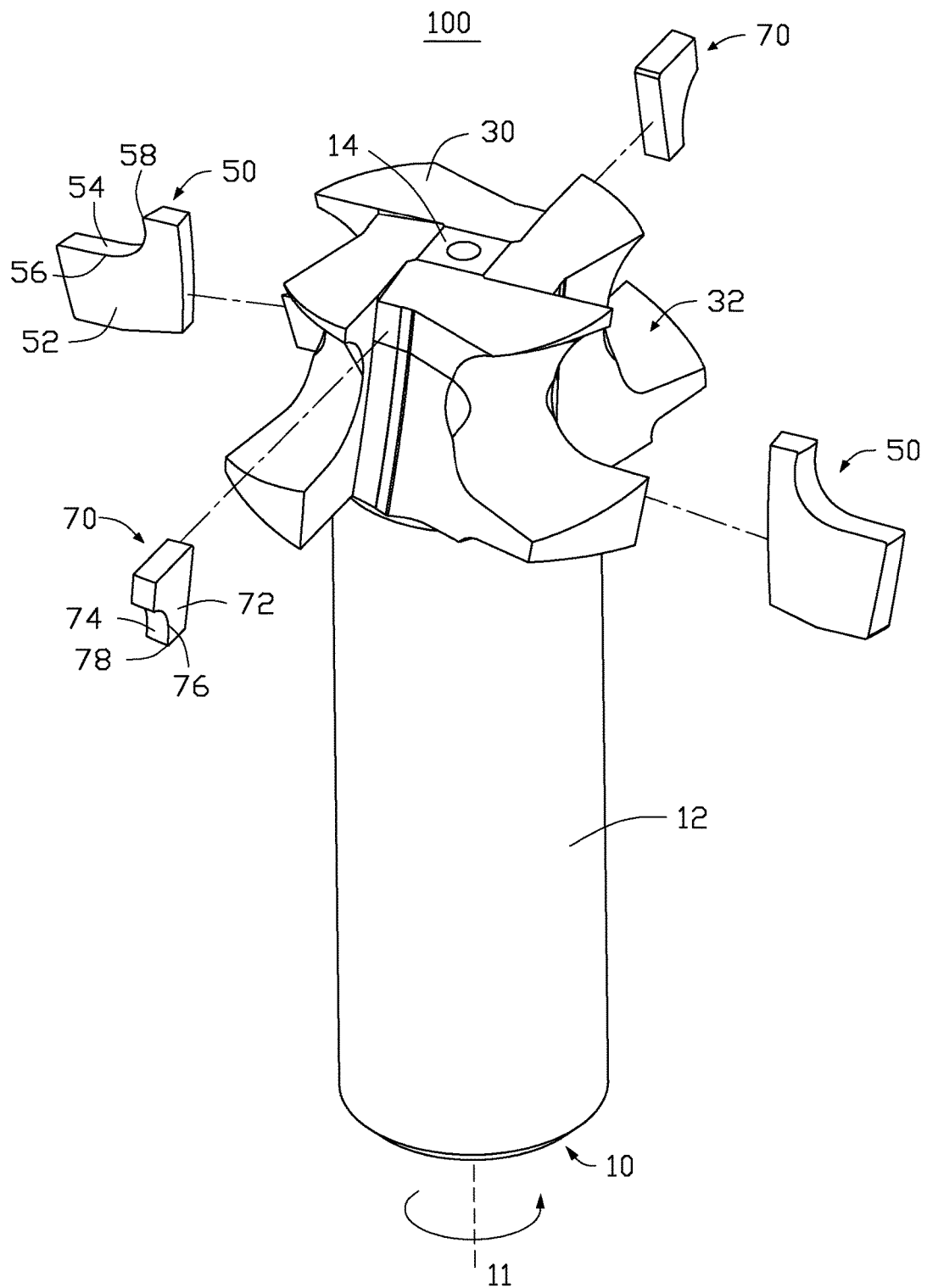
FIG. 3 is an exploded view of the milling cutter shown in FIG. 2.

FIG. 3 illustrates that the first blades 50 can number two, and the second blades 70 can number two. The two first blades 50 can be arranged opposite to each other, and the two second blades 70 can be arranged opposite to each other. Referring to FIG. 2 and FIG. 3, the first blade 50 can be mounted at one end of the blade support 30 adjacent to the main body 12 and overlap with the mounting surface 34. The first blade 50 can be in the form of a sheet and include a first flank face 52 and a first rack face 54 adjacent to the first flank face 52. The first flank face 52 can be substantially parallel to and away from the mounting surface 34, and the first flank face 52 can be arranged at the front end of the first blade 50 when the first blade 50 rotates. The first flank 52 can be inclined to the central axis 11 of the shank 10. The first rack face 54 can be arranged away from the assembly end 14 and near the blade support 30. In at least one embodiment, the first rack face 54 can be a curved surface relative to the first flank face 52. A common line of the first rack surface 54 and a first flank face 52 can be a first cutting edge 56.

The second blades 70 and the first blades 50 can be positioned alternatively along a circumference of the assembly end 14, and positioned alternatively along the central axis 11 of the shank 10. The second blade 70 can be mounted at one end of the blade support 30 away from the main body 12 and overlap with the mounting surface 34. Each second blade 70 can be sheet and include a second flank face 72 and a second rack face 74 adjacent to the second flank face 72. The second flank face 72 can be substantially parallel to and away from the mounting surface 34. The second flank face 72 can be arranged at the front end of the second blade 70 when the second blade 70 rotates and can be inclined to the axis of the shank 10. In at least one embodiment, the second flank face 72 can be a curved surface. A common line of the second rack surface 74 and a second flank face 72 can be a second cutting edge 76. A vertex of the first cutting edge 56 away from the main body 12 can be a first tool nose 58. A vertex of the second cutting edge 76 adjacent to the main body 12 can be a second tool nose 78.

Figure 4:
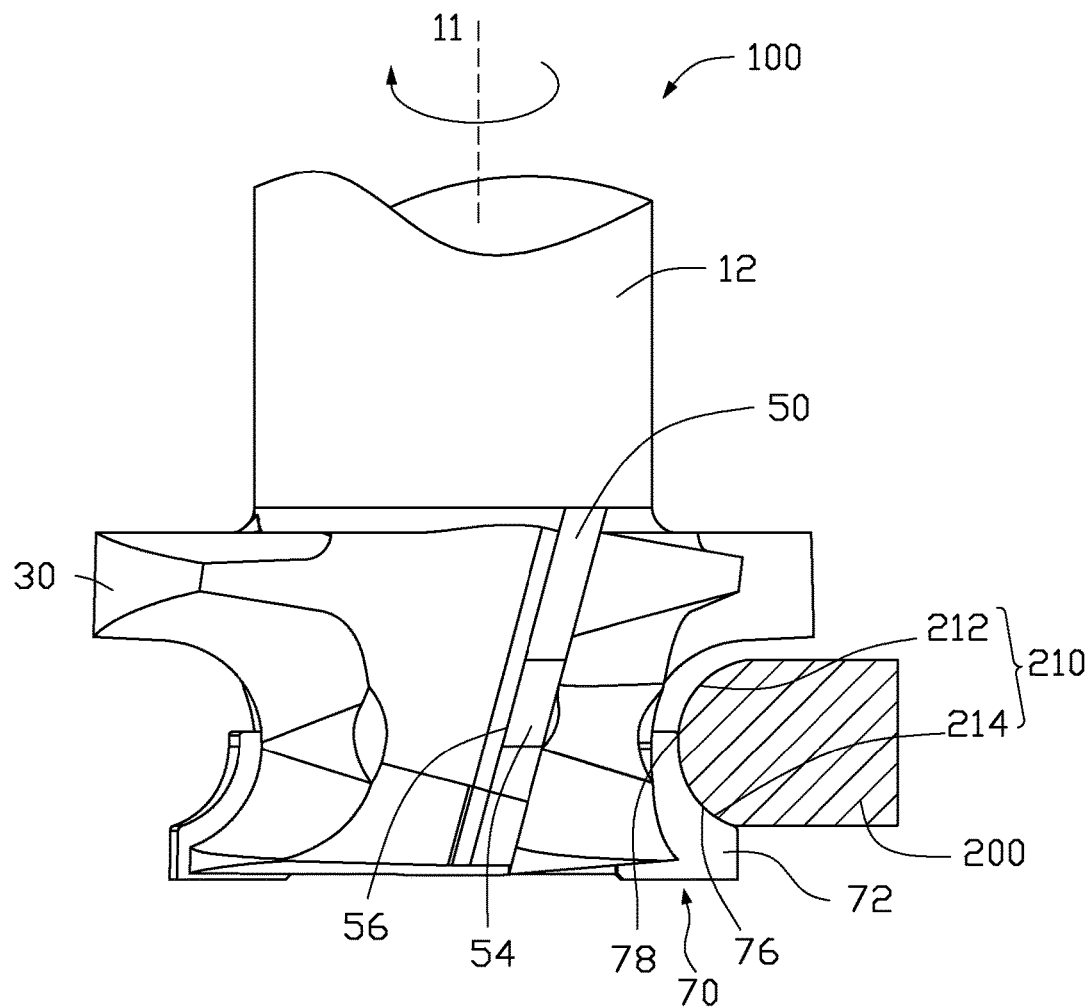
FIG. 4 is a front view of the milling cutter shown in FIG. 1 in a first state.

FIG. 4 illustrates that the milling cutter 100 can be used to process a workpiece 200, such that the workpiece 200 can have a predetermined external profile. The workpiece 200 can be substantially plate shaped (not shown), and the external profile can be formed at periphery of the workpiece 200. A cross-sectional surface of the external profile can be a circular curved external profile 210. The external profile 210 can include a first portion 212 and a second portion 214 coupled to the first portion 212. In at least one embodiment, the first portion 212 and the second portion 214 can be arc-shaped.

The second cutting edge 76 can be an arc-shaped edge and match to the second portion 214 of the external profile 210. The second cutting edge 76 can be configured to process the second portion 214.

Figure 5:
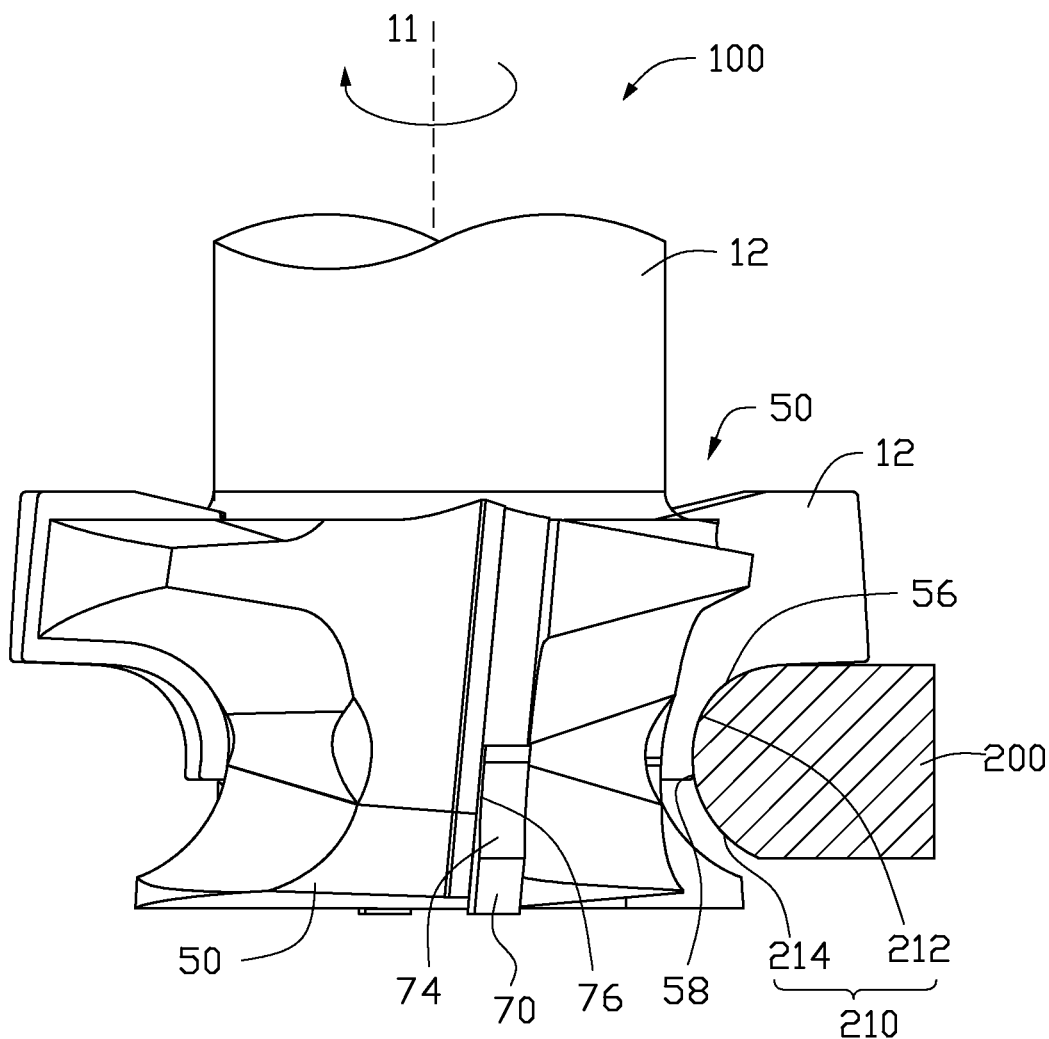
FIG. 5 is a left view of the milling cutter shown in FIG. 1 in a second state.

FIG. 5 illustrates that the first cutting edge 56 can be an arc-shaped edge and match to the first portion 212, and the first cutting edge 56 can be configured to process the first portion 212.

When the milling cutter 100 rotates about its axis to process the workpiece 200, the first blade 50 can rotate around the central axis 11 of the shank 10, and the first cutting edge 56 can rotate along a first rotation path to process the first portion 212 of the external profile 210. Then, the milling cutter 100 can continue to rotate, and the second blade 70 can rotate around the axis of the shank 10. The second cutting edge 76 can rotate along a second rotation path to process the second portion 214 of the external profile 210. The milling cutter 100 can continue to rotate, and the first blade 50 and the second blade 70 can process the workpiece 200 in turn, thereby forming the profile 210.

The first rotation path can intersect with, tangent to, or partially overlap with the second rotation path. The first rotation path can also intersect with, but not overlap with the second rotation path, such that the first portion 212 can connect with the second portion 214 to form the profile 210.

Figure 6:
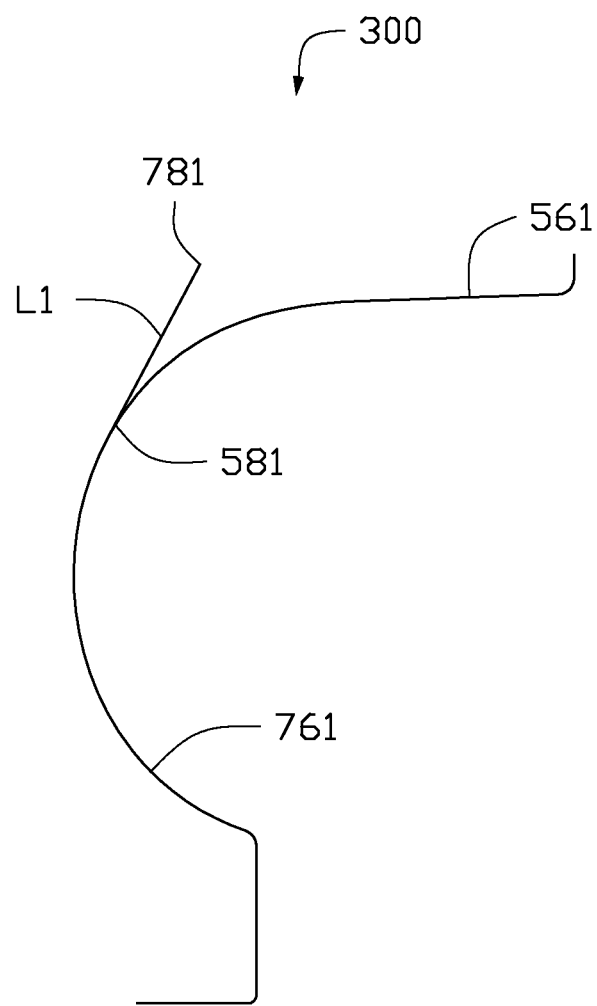
FIG. 6 is a projection diagram of profiles of cutting edges of the cutter shown in FIG. 1.

Referring to FIG. 2 and FIG. 6, the central axis 11 of the shank 10 and the first tool nose 58 can cooperatively define a first plane, and the first blade 50 can be projected towards the first plane. A projection line of the first cutting edge 56 can be defined as a first projection line 561, and a projection point of the first tool nose 58 can be a first terminal 581 of the first projection line 561. The first projection line 561 can be match to the first portion 212 of the profile 210. The central axis 11 of the shank 10 and the second tool nose 78 can cooperatively define a second plane, and the second blade 70 can be projected towards the second plane. A projection line of the second cutting edge 76 can be defined as a second projection line 761, and a projection point of the second tool nose 78 can be a second terminal 781 of the second projection line 761. The second projection line 761 can match the second portion 214 of the profile 210. The second plane can rotate around the central axis 11 of the shank 10 until the second plane overlaps with the first plane. In this situation, the first projection line 561 and the second projection line 761 can intersect at the first terminal 581, and the first projection line 561 and the second projection line 761 together form an arc 300. The arc 300 can be consistent with the profile 210 of the workpiece 200. Thus the milling cutter 100 can process the workpiece 200 to form the external profile 210.

One side of the second tool nose 78 of the second blade 70 can extend toward the main body 12, and the second projection line 761 can include an extension line L1 extending from the first terminal 581. In at least one embodiment, the extension line L1 can be a straight line and tangent to the second projection line 761 at the first terminal 581. The extension line L1 can be also tangent to the first projection line 561. In other words, the junction of the first projection line 561 and the second projection line 761 can be smooth, such that the profile 210 processed by the milling cutter 100 can be a smooth continuous curve. A length of the extension line L1 can be in a range from about 0.05 millimeter (mm) to about 2 mm. In at least one embodiment, the length of the extension line L1 can be about 0.5 mm. In other embodiments, the length of the extension line L1 can be varied as the profile 210 changes.

A milling cutter of a second embodiment of this disclosure can be similar to the milling cutter 100 of the first embodiment and include a shank, a plurality of blade supports, two first blades and two second blades, except that, the number of the blade supports are six (not shown). The milling cutter can further include two third blades (not shown). The two first blades, the two second blades, and the two third blades can be arranged around the shank alternatively. Each blade can be coupled to one corresponding blade support, and the third blade can be arranged between the first blade and the second blade. When the milling cutter rotates around the central axis thereof to process the workpiece 200, the first blade, the second blade, and the third blade can process the workpiece 200 in turn, thus the profile 210 can be formed.

Figure 7:
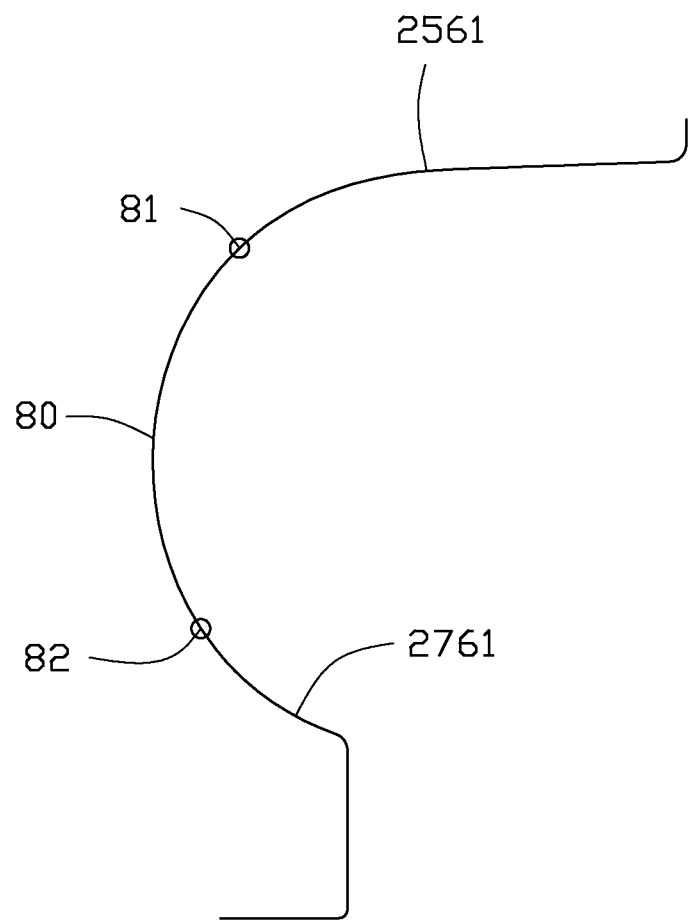
FIG. 7 is a projection diagram of profiles of cutting edges of a cutter of a second embodiment.

The second blade can include a third cutting edge, a third tool nose and a fourth tool nose arranged at two opposing ends of the third cutting edge. Referring to FIG. 7, the central axis of the shank and the third tool nose can cooperatively define a second plane, and the third blade can be projected towards the third plane. A projection line of the third cutting edge can be a third projection line 80, and projection points of the third tool nose and the fourth tool nose can be terminals 81 and 82 of the third projection line 80. When the third plane rotates around the central axis of the shank to overlap with the first plane, the terminals 81, 82 can be coupled to a first projection line 2561 and a second projection line 2761, thus the first projection line 2561, the third projection line 80, and the second projection line 2761 can be coupled to form an arc. The arc can be consistent with the profile 210. The junction between the third projection line 80 and the first projection line 2561 can be smooth, and the junction between the third projection line 80 and the second projection line 2761 can be smooth.

Similar to the first embodiment, the third tool nose and the fourth tool nose can extend toward two sides, and the third projection line 80 can include two extension lines (not shown). Then, extension lines can partially overlap with, or be tangent to the first projection line 2561 and the second projection line 2761. Thus the junction between the third projection line 80 and the first projection line 2561 or the second projection line 2761 can be smooth. When the extension lines partially overlap with the first projection line 2561 and the second projection line 2761, the extension lines can extend away from the workpiece 200. In other words, the extension lines can extend toward the central axis of the shank, which can prevent a part of the cutting edge corresponding to the extension lines from destroying the surface of the workpiece 200. Similarly, the milling cutter can further include a fourth blade, a fifth blade, or other blades.

The milling cutter of this disclosure can include the first blade 50 and the second blade 70, which is different with the conventional milling cutter having a one-piece blade. When the milling cutter 100 rotates to process the workpiece 200, the first blade 50 and the second blade 70 can process the workpiece 200 in turn and form the first portion 212 and the second portion 214 connected to the first portion 212. Thus the workpiece 200 can be formed into a desired external profile 210. The external profile 210 can be processed in sections because the first blade 50 and the second blade 70 are separate. The material of the workpiece processed by the first blade 50 and the second blade 70 can be less than that of the conventional blade, and the cutting edges of the first blade 50 and the second blade 70 can be smaller. Thus the milling process can be more stable, and the surface of the workpiece 200 can be more smooth. At the same time, the cutting resistance is smaller than the conventional milling cutter, so the blades of the milling cutter 100 is not prone to be worn or cracked, and the lifespan of the milling cutter 200 can be prolonged. Moreover, as the first blade 50 and the second blade 70 are arranged distanced from each other, and chip grooves 32 are defined in blade supports 30, chips can be removed from the chip grooves 32 timely and a cooling liquid can flow smoothly. A cooling effect of the milling cutter 100 is good, so the blades can be prevent from turning causing by overheat, and the lifespan of the milling cutter 100 can be further prolonged.

In other embodiments, the blade supports 30 can be omitted, and the first blades 50 and the second blades 70 can be mounted on the shank 10.

The first blades can number one or more, and the second blades can number one or more. The number of the first blades can be equal to the number of the second blade, and the first blade and the second blade can be alternatingly arranged around the shank.

In other embodiments, the extension line L1 can be omitted, and the first terminal 581 can overlap with the second terminal 781, thus the junction of the first projection line 561 and the second projection line 761 can be smooth.

In other embodiments, one side of the first blade 50 with the first tool nose 58 can extend away from the main body 12, and the first projection line 561 can include another extension line (not shown) extending from the junction of the first projection line 561 and the second projection line 761. The extension line can tangent to, or partially overlap with the second projection line 761, such that the junction of the first projection line 561 and the second projection line 761 can be smooth, and the profile processed by the milling cutter 100 can be smooth.

In other embodiments, the profile line 210 can be complex and divided to a plurality of sections. Accordingly, the milling cutter 100 can include many groups of the blades corresponding to the sections and a plurality of blade supports used to mount the blades. The projection lines of the groups of the blades can be connected in turn and form an arc in consistent to the profile 210. Optimum subsection point can be the point at which the profile line 210 is at a minimum distance from the central axis 11 of the shank 10, or the point at which a curvature of the profile abrupt. In this situation, the cutting resistance of the milling cutter 100 is decreased, and the using life of the milling cutter 100 can be prolonged.

In other embodiments, the profile 210 of the workpiece 200 can be shapes other than the curved shape. For example, the profile 210 can be an irregular curve or a non-line contour. Similarly, the profile of the workpiece 200 can be divided to sections to be processed.

The embodiments shown and described above are only examples. Many details are often found in the art such as the other features of a milling cutter. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size and arrangement of the parts within the principles of the present disclosure up to, and including, the full extent established by the broad general meaning of the terms used in the claims. It will therefore be appreciated that the embodiments described above may be modified within the scope of the claims.

What is claimed is:

1. A milling cutter configured to process an edge of a workpiece to define a required profile of the workpiece, the required profile comprises a first portion and a second portion connected to the first portion, the milling cutter comprising:
   a shank having a central axis;
   at least one first cutting edge configured to rotate around the central axis of the shank along a first rotation path to process the first portion of the predetermined profile, and
   at least one second cutting edge configured to rotate around the central axis of the shank along a second rotation path to process the second portion of the predetermined profile;
   wherein the first rotation path is different from the second rotation path, and the first rotation path is at a tangent to the second rotation path;
   wherein the milling cutter further comprises at least one first blade and at least one second blade alternatively coupled to the shank, the first cutting edge is formed on the at least one first blade, and the second cutting edge is formed on the at least one second blade;
   wherein the at least one first blade comprises a first flank face and a first rake face adjacent to the first flank face, the first cutting edge is a common edge of the first flank face and the first rack face, and the first flank face is inclined to the central axis of the shank, and/or
   wherein the at least one second blade comprises a second flank face and a second rack face adjacent to the second flank face, the second cutting edge is a common edge of the second flank face and the second rack face, and the second flank face is inclined to the central axis of the shank.

2. The milling cutter as claimed in claim 1, wherein the at least one first cutting edge and the at least one second cutting edge are alternatively arranged along a circumference of the shank.

3. The milling cutter as claimed in claim 1, wherein the shank comprises a main body and an assembly end, the assembly end is formed at one end of the main body and configured for mounting the first blade and the second blade, the first blade is coupled to one end of the assembly end adjacent to the main body, and the second blade is coupled to one end of the assembly end away from the main body.

4. The milling cutter as claimed in claim 3,
   wherein the milling cutter further comprises a plurality of blade supports arranged along a circumference of the assembly end, and the first blade and the second blade are mounted on the blade supports; and
   wherein the first blade and the second blade are arranged corresponding to each blade support, thereby the first blade and the second blade are arranged alternatively along the circumference of the shank and arranged alternatively along the central axis of the shank.

5. The milling cutter as claimed in claim 4, wherein one surface of each blade support away from the assembly end defines a chip groove.

6. The milling cutter as claimed in claim 1, wherein the first cutting edge is distanced from the second cutting edge.

7. A milling cutter comprising:
a shank having a central axis;
a first blade coupled to the shank and comprising:
  a first cutting edge, and
  a first tool nose positioned at one end of the cutting edge; and
a second blade coupled to the shank and comprising:
  a second cutting edge, and
  a second tool nose positioned at one end of the cutting edge;
wherein the first blade and the second blade are arranged alternatively along the central axis of the shank;
wherein a first plane is defined by the first tool nose and the central axis of the shank, and a projection line of the first cutting edge towards the first plane is defined as a first projection line;
wherein a second plane is defined by the second tool nose and the central axis of the shank, and a projection line of the second cutting edge towards the second plane is defined as a second projection line;
wherein the first projection line is connected to the second projection line when the second plane rotates around the central axis to a state that the second plane overlaps with the first plane;
wherein one side of the first tool nose of the first blade extends toward the second blade to form an extension line at the junction of the first projection line and the second projection line, and the extension line is a straight line tangent to the first projection line or a curved line partially overlapping with the first projection line; and/or
one side of the second tool nose of the second blade extends toward the first blade to form another extension line at the junction of the first projection line and the second projection line, and the other extension line is a straight line tangent to the first projection line or a curved line partially overlapping with the first projection line.

8. The milling cutter as claimed in claim 7, wherein the first cutting edge is arc-shaped and the first projection line is an arc, the second cutting edge is arc-shaped and the second projection line is an arc, and a junction of the first projection line and the second projection line is smooth.

9. The milling cutter as claimed in claim 7, wherein a length of the extension line is in a range from about 0.05 mm to about 2 mm.

10. The milling cutter as claimed in claim 7, wherein the first projection line is connected to the second projection line to form a continuous curve when the second plane rotates around the central axis to a state that overlapping with the first plane, and a junction of the first projection line and the second projection line is at which the curve is at a minimum distance from the central axis, or at which a curvature of the curve abrupt.

* * * * *

UNITED STATES PATENT AND TRADEMARK OFFICE
CERTIFICATE OF CORRECTION

PATENT NO. : 10,112,240 B2
APPLICATION NO. : 14/805751
DATED : October 30, 2018
INVENTOR(S) : Jun-Qi Li et al.

Page 1 of 1

It is certified that error appears in the above-identified patent and that said Letters Patent is hereby corrected as shown below:

On the Title Page

Please replace item (73) regarding "Assignee" with the following:
(73) Assignee: JI ZHUN PRECISION INDUSTRY (HUI ZHOU) CO., LTD., Huizhou (CN)

Signed and Sealed this
Fifth Day of November, 2019

Andrei Iancu
*Director of the United States Patent and Trademark Office*